United States Patent [19]

Rabiniow

[11] Patent Number: 5,407,399
[45] Date of Patent: Apr. 18, 1995

[54] VARIABLE SPEED FRICTION TRANSMISSION

[76] Inventor: Jacob Rabiniow, 6920 Selkirk Dr., Bethesda, Md. 20817

[21] Appl. No.: 202,164

[22] Filed: Feb. 25, 1994

[51] Int. Cl.$^6$ .................. F16H 15/24; F16H 15/46
[52] U.S. Cl. .......................... 476/55; 476/26; 476/59
[58] Field of Search .................. 476/26, 55, 59

[56] References Cited

U.S. PATENT DOCUMENTS

| | | | |
|---|---|---|---|
| 1,247,732 | 11/1917 | Shelton | 476/26 |
| 3,158,041 | 11/1964 | Rae | 74/690 |
| 5,014,565 | 5/1991 | Stephenson | 74/190 |

FOREIGN PATENT DOCUMENTS

| | | | |
|---|---|---|---|
| 1003009 | 11/1951 | France | |
| 1234118 | 2/1967 | Germany | 476/55 |
| 26750 | 8/1907 | Sweden | 476/55 |
| 1237827 | 4/1986 | U.S.S.R. | 476/55 |
| 1562565 | 5/1990 | U.S.S.R. | 476/55 |

OTHER PUBLICATIONS

Loewenthal, S. H. "Advances in Traction Drive Technology" NASA Technical Prior Sep. 2, 1983. Memorandum No. 83397, Sep. 1983.
Lubomyr O. Hewko "Automotive Traction Drive CVTs–An Overview" Sep. 1986.

Primary Examiner—Allan D. Herrmann
Attorney, Agent, or Firm—William D. Hall

[57] ABSTRACT

A variable ratio friction transmission is described in which one element is a straight sided cone and the other a roller or wheel. The two are in frictional engagement. The roller or wheel moves over an element of the cone to change the speed ratio, and at all times stays parallel to itself and moves along a straight line axis. This axis passes through the apex of the cone at all times, but the cone is tilted about its apex to contact the roller or wheel as the ratio is changed.

6 Claims, 4 Drawing Sheets

VARIABLE SPEED FRICTION TRANSMISSION

BACKGROUND OF THE INVENTION

Variable speed transmissions have been designed and built for well over one hundred years, but the basic principles of efficient and long life operations have been largely ignored. It has been occasionally recognized that for two bodies to transmit a rolling force between them the two bodies must both be cones with their apexes at one identical point. The cones can have many different shapes. I am assuming that the cones of interest here are fight angle, circular cones. This means that if a plane is passed at a right angle to the axis of the cone the intersection will be a circle. This distinguishes the circular cone from elliptical or other non-circular cones.

The cone can be a "male" cone of gradually larger and larger angle between opposite elements, finally becoming a fiat disc. A fiat disc is a cone of 180 degrees. The cone then can become a "female" cone of progressively smaller inside angle.

A cylinder is a cone with an included angle of 0 degrees, with the apex at infinity. This is why two cylinders can roll on each other as can any two other straight line cones. A cone can also roll on a flat disc as long as its apex is at the center of the disc.

A common version of a variable drive has been a cylinder which is rolling on a flat disc. While the disc is a cone of 180 degrees included angle, the wheel is not a proper cone and the resulting contact between the two parts does result in a driving relationship but also in what is called "spin" at the small area of contact. This spin leads to waste of energy, the production of heat and large increase of wear.

Many prior versions of variable speed friction drives use discs, cones or toruses where the torque is transmitted from one such element to an intermediate member, called an idler, and from the idler to another element that may also be a cone, or a disc or a torus. Such drives suffer from the further disadvantage in that the efficiency is further reduced. If the efficiency of one friction point is, say, 90%, and the second point is also 90%, the over-all efficiency is the product, or 81%.

A third fault found in prior art is that the cones or discs of the contacting elements are curved so as to increase the area of contact between them. This prevents the elements from correctly rolling on each other and causes unnecessary friction very much like spin and with the same deleterious effect.

The above difficulties with prior art devices does not mean that many of them are not useful for low power, instrument or control use. But for high power application such as automobile transmissions or for large machinery use, the friction devices must make use of the best possible technology.

In the book "Continuously Variable Transmissions for Passenger Cars," published by the SAE, there is a reproduction of a drawing that appeared in a NASA Technical Memorandum No. 83397, September 1983, P. 15. It is interesting to note that not one design in this collection of 15 variable speed friction drive mechanisms meets the criteria of two cones, or parts of cones that roll on each other and that have a common point for their apexes. Several of them use idlers between their main rotating elements, further lowering their efficiencies. In some cases, the idlers take the form of belts or rings, but the effect on efficiencies is the same.

In searching through the art of variable speed friction drives I found three inventions that are worth special comments.

The first is U.S. Pat. No. 5,014,565 issued to Stephenson. He fully realizes that the rolling wheel 12 in his FIG. 1 must have its axis meet the axis YY of the wheel 10 at a common point. The surface of the wheel 10, however, is concave and that prevents true rolling between the wheel 12 and the wheel 10. Stephenson states in the bottom paragraph of column 4 that "a pure rolling contact exists" between element 10 and wheel 12 at any point "on their respective contact faces." This is correct if the elements touch at only one point. If the area of contact is increased by elastic deformation or by the use of a suitable intermediate fluid, the rolling is not pure and some sliding will be present. There is a statement at the top of column 5 that reads "Widening the contact area at point C does not give rise to frictional losses, unlike the prior art transmission described earlier." This is not correct. Widening the contact area will give rise to frictional losses. The use of curved surfaces increases the contact areas but this expedient also gives rise to friction losses.

To clarify this point it should be noted that two cones with a common apex point can roll on each other even if they were to contact along their entire length. This cannot be done with a concave cone in full length contact with another element that is curved to fit. The arrangement of FIG. 1 of this patent also requires that the plate 10 be lowered or raised as the wheel 12 moves in or out on its axis XX. The plate can be kept at a constant height but the wheel axis must be raised and lowered as the speed ratio is changed.

U.S. Pat. No. 3,158,041 to Rae discusses the problem of rolling a simple conical wheel on a surface of a straight sided cone (FIG. 1). Rae correctly points out that such an arrangement can be correct at only one position of the wheel and will cause spin at any other position. Rae also points out that using a cylindrical wheel would be even worse. At no point will be rolling be correct.

To improve the situation Rae describes a cone whose surface is such that a tangent (in the plane of the axis) from any point on the surface to the axis of the cone will have a fixed length (FIG. 2). A conical roller having this identical length of axis, will roll well on the surface of the cone. Since the roller has appreciable thickness the rolling will not be completely correct. One edge of the roller will contact one tangent to the cone surface while the other edge will contact another tangent. The two tangents of the curved cone cross the axis at two different points while the axis of both edges of the conical roller is of only one fixed length. This will prevent pure rolling but the effect will be small if the roller is thin. The use of a thin roller on a curved cone leads to the practical difficulty in that the roller cannot remain parallel to itself as it is made to contact various positions on the curved cone. This is why the mechanisms shown in FIG. 3 are so unusual and so complex.

This patent also shows a differential gear device by which changes of speed by a friction device can produce wide changes of speed, including zero speed. Such devices have nothing to do with the subject of friction devices, but it should be noted that their efficiencies are zero at zero speed and very low at low speeds. They illustrate poor engineering design and should not be pan of an otherwise interesting patent.

A difficulty that is also present in this patent is that the friction contact between the cone and the roller make use of two male elements. The area of contact is therefore very small and this required very large contact forces to produce reasonable friction torques.

The French Patent No. 1,003,009 to Honoré issued in 1951 is the most interesting of the three that attempt the use rolling cones whose axes meet at a common point. Honoré uses a male cone that rolls on a section of a female cone with the contact between them being at a point. As long as the area of contact is very small, this results in good rolling action. If the contact area is increased by using two surfaces whose curves match for an appreciable distance, then pure rotation cannot occur.

I covered this point in my discussion of the two prior patents. There is one feature of the Honoré patent that is of special interest to me. This is shown in FIG. 1 where the male cone 1 is shown (in dotted lines) fully engaged with the female ring 2 so that there is no more rolling contact between them, but the two now constitute a cone-clutch. To make this clutching possible, the dimensions of the male cones and the female tings (portions of cones) must not be too different in radial dimensions. This, in turn, limits the practical speed ratio that are easy to obtain with his designs. To overcome this difficulty, Honoré also resorts to the use of a differential gear in FIG. 4. As I stated before, this is most inappropriate method of obtaining low speeds and is not worthy of the technology of this patent.

The embodiments of the invention covered by Patent No. 1,003,009 all require that the relative motions of the male and female members consist of motions along the axes of the elements and also changes of angles between the axes so that the instantaneous apexes of the cone elements in contact come together at common points.

Honoré does not illustrate how such motions are produced except in FIG. 9 where curved guide surfaces are used to move the rings 2' and 2" as they contact the male cones. The use of gears that do not mesh properly, as in FIGS. 4, 5, 8, 9, and 10, is mentioned only in passing as, for example, in gears 11 and 12 of FIG. 4. This is also true of the meshing of the cylindical gear 23 with the gear 22 of the cone ring 2. The gears of FIG. 8 and 9 are stated to permit the complex motions of the rings to which they are attached.

Summarizing my comments of the prior art, I believe that all of the designs that have been and are now built commercially suffer from inefficiencies and wear due to improper rolling action. No successful automobile variable speed friction drive of the type of interest here has emerged. Variable speed belt drives, hydraulic drives and other mechanisms have been used successfully, but they have no bearing on my invention.

LIST OF DRAWINGS

DESCRIPTION OF MY INVENTION

According to my invention, I provide a variable speed friction drive that is relatively simple and efficient and can produce a wide-range of speed ratios. It also can result in a lock-up condition after the speed ratio approaches 1:1.

Figure 1:
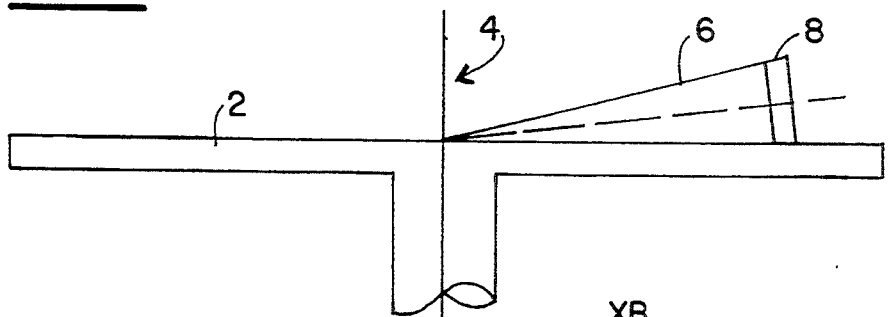
FIG. 1 shows the basic mechanism of a friction drive where one cone rolls on another which in this case is a fiat disc.

To develop the philosophy of my invention, please consider FIG. 1. Here a disc 2 is rotatable on axis 4. Contacting the disc 2 is a cone 6 whose apex contacts the center of the disc 2 with pure rolling motion.

Any section of the cone 6, such as narrow wheel 8, will also roll on the disc 2 perfectly.

Figure 2:
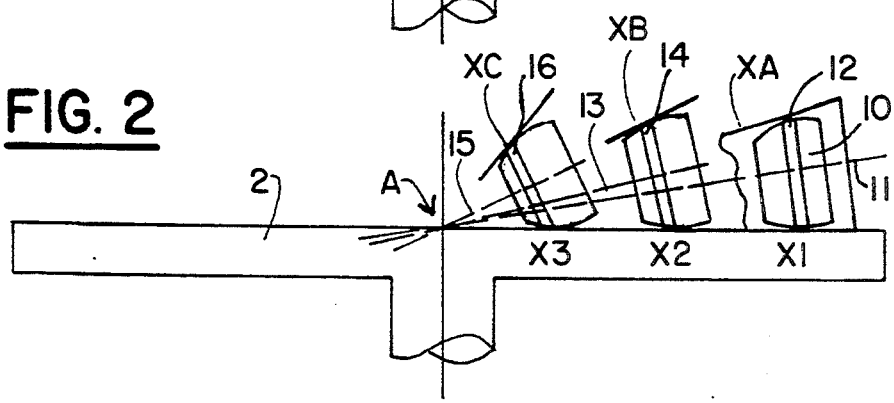
FIG. 2 shows a possible cone and wheel system with correct rolling action like that of FIG. 1.

Now consider FIG. 2. Here the cone 6 of FIG. 1 is replaced by a barrel shaped wheel 10. In position X1 the wheel 10 is tilted so that the axis 11 on which it can rotate passes through point A. The wheel 10 will have narrow section 12 that can be considered an element of a cone XA that rolls correctly on the disc 2. At position X2, the wheel 10 is tilted so that its new axis 13 again passes through point A. The wheel 10 now has a new narrow section 14 of cone XB. This cone XB can also roll correctly on disc 2. Similarly I can move the wheel 10 to point X3 and tilt it so that its new axis 15 passes through point A. The element of the wheel 10 is now 16. It is an element of cone XC.

Thus, I have outlined a device for obtaining a variable speed ratio between a cone and a wheel with correct rolling action as long as the areas of contact are very small. The actual areas will depend on the forces applied between the cone 2 and the wheel 10, on the hardness of the materials, on the elastic deformation of the surfaces in contact and on the amount of lubricant present between the two bodies, if lubricant is used.

Figure 2A:
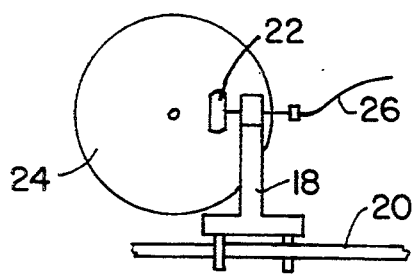
FIG. 2a shows a possible embodiment of a friction mechanism using the principles of FIG. 2.

Such a device can be built by mounting the wheel 22 on an arm 18 somewhat like a phonograph cartridge on a phono arm (FIG. 2a). The arm 18 can ride on tracks 20 that not only guide the wheel 22 along a radius of the plate 24, but also tilt the wheel 22 as required. The wheel 22 can be driven in many ways but a flexible cable 26 can serve to couple the wheel to any external mechanism.

Figure 3A:
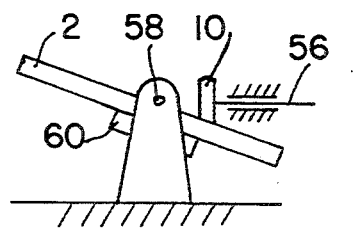
FIG. 3a shows a possible embodiment of the basic mechanism of the principles of FIG. 3.
Figure 3:
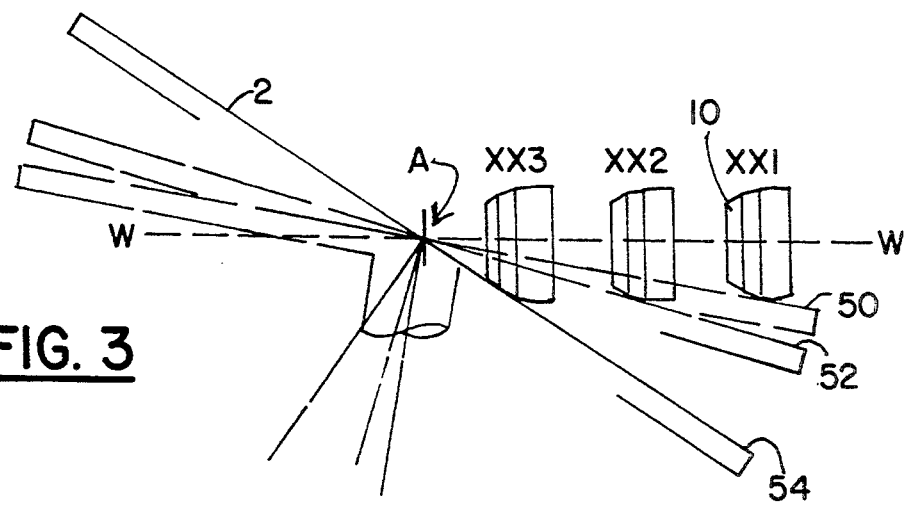
FIG. 3 shows another possible cone and wheel system with correct robing action like that of FIG. 2 except that the wheel stays parallel to itself at all times.

Now consider the mechanisms of FIG. 3. Here I will move the wheel 10 along a fixed axis WW, but I will arrange to support the disc 2 so that its axis can pivot about point A as shown by the dotted lines. At first position XX1 of the wheel 10, the disc 2 is pivoted so to contact the wheel 10 as formerly but the disc 2 is now tilted instead to position 50. The relative geometry as compared to position X1 of FIG. 2 is not affected.

As I move the wheel 10 to position XX2, the disc 2 has to be moved to a new angle as shown by the surface line 52. And finally, as I move the wheel 10 to position XX3, the disc 2 has to be tilted to a still steeper angle as shown by the surface line 54. The advantage of doing what I show in FIG. 3 is that the mechanical problems of moving the elements relative to each other become much easier to solve.

Such a mechanism can also be constructed for special purposes. It has the advantage that the wheel 10 is always parallel to itself and can be driven by a simple straight shaft 56 (see FIG. 3a). The bearing 58 that supports the plate 2 can be mounted on a simple gimbal 60 so that it can be tilted to the positions shown in FIG. 3. The rotational energy can be fed to or from the plate by a universal joint located at or near the plate's center. A spring or other means can be used to provide a torque to the plate gimbal 60 to provide a counter-clockwise torque so as to keep the plate 2 in contact with the wheel 10. See FIG. 3a for a possible arrangement.

Figure 4:
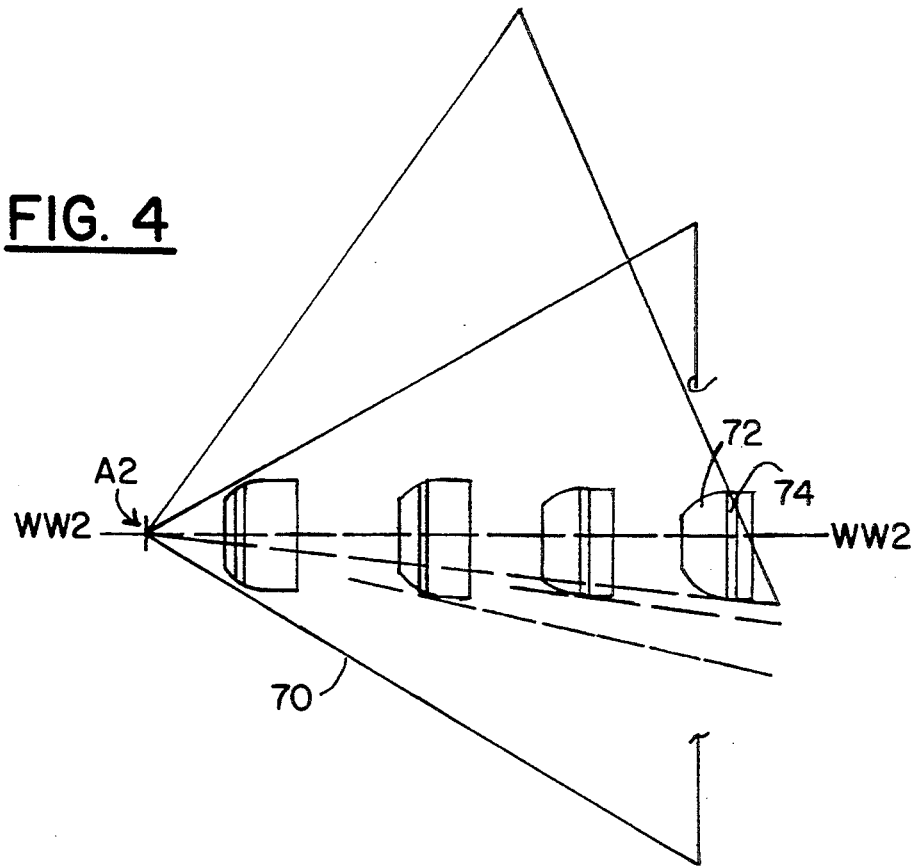
FIG. 4 shows the schematic arrangement of a preferred embodiment of my invention.

Now please consider FIG. 4. Here I use a female cone 70 and a wheel 72 that rolls inside of this cone 70. There are several obvious and some not obvious advantages of using a female cone 70 and a wheel 72 inside it. The length of contact is now much greater than it can be had with a flat disc or a male cone. The angles of tilt are easier to accomplish. And, finally, a complete lock-up between the cone 70 and the wheel 72 can be achieved as taught by the patent to Honoré and by another expedient of mine that I will explain.

Assume for the FIGS. 4, 5, 6, and 7 that the cone has an included angle of 60 degrees. This is only by way of an example. Cones with other included angles can be used depending on the whim of the designer.

FIG. 4 shows the various positions of cone 70 as it is tipped about point A2 so as to contact wheel 72 as this wheel is moved along its axis WW2.

As the wheel 72 approaches the apex A2 of the cone 70, its outside line 71 becomes equal to the inside circle of the cone 70 and the overall device of FIG. 4 becomes a cone clutch with no rolling actions between the cone 70 and the wheel 72. This is similar to the locked-in condition of the two main elements of the French patent No. 1,003,009. In that invention it is the outside diameter of the male cone that becomes engaged with the large diameter of the female cone ring in which it normally rolls. It should now be obvious why I choose to use a cone with straight sides. Such a cone has a fixed apex while the curved cone surfaces of Honoré, Rae and Stephenson have apexes that move along their axes depending on what section of the cone is active.

At this point I want to point out another interesting advantage of my invention as compared to the inventions of Stephenson, Rae, and Honoré. If the small wheel, roller, or cone surfaces of the three cited patents wear to a smaller diameter or to a different shape, the relative rotation in the elements of those patents will no longer roll as they were intended. Their axes will not meet at the points that were correct before the rollers were worn.

This is not true for my invention. If the wheels in FIG. 4, 5, or 6 are reduced in their diameters over their entire surfaces, or at some particular circular areas, the rolling will be still correct because the wheel 72 axis WW2—WW2 in FIG. 4, for example, will still pass through the apex of the cone 70.

All that will happen is that the cone 70 will tilt to a slightly different angle to accommodate the slightly smaller wheel 72.

Another and related advantage of my invention is that wheels of different diameters can be substantiated for each other with no change in the mechanisms. The cone angle is self-adopting.

Figure 5:
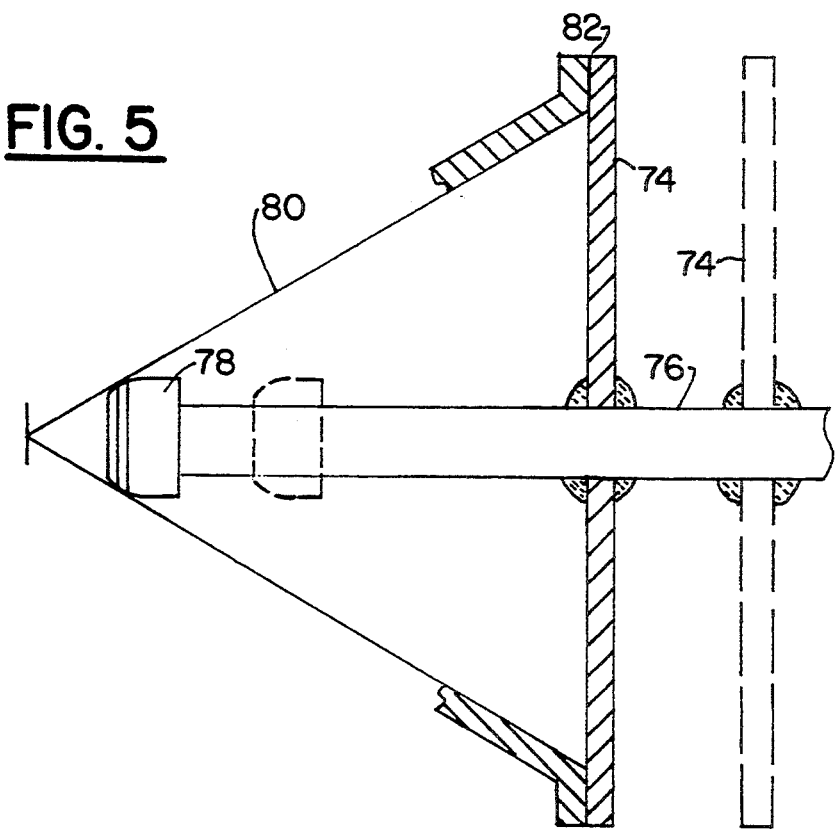
FIG. 5 shows my invention when the mechanism is in the locked-clutch condition, aided by a separate clutch plate.
Figure 6:
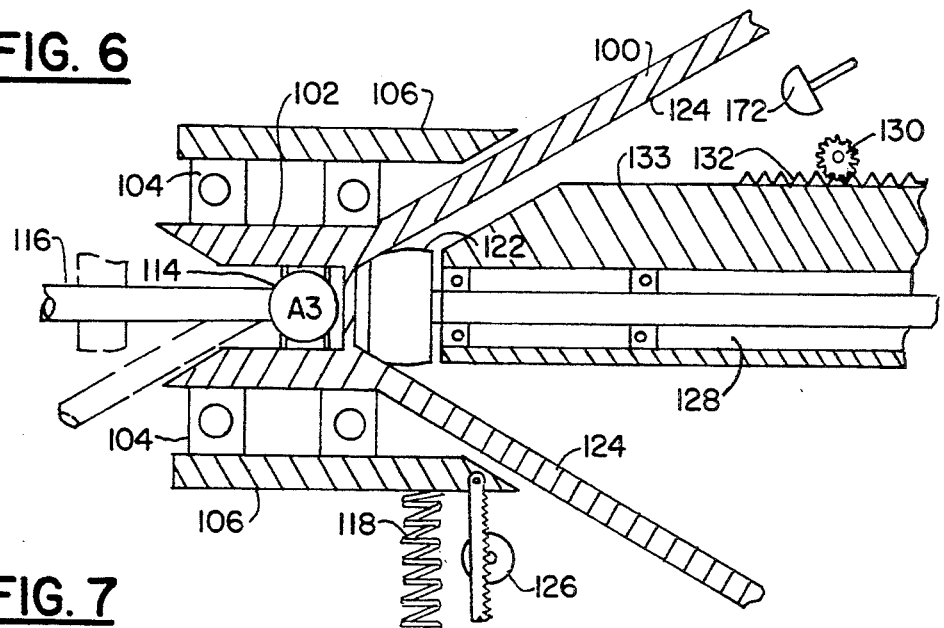
FIG. 6 shows a detailed sectional view of my invention in a practical embodiment.

If a more positive lock-up is desired in my invention than the joining of cone 70 and disc 72 as described, I provide a clutch plate 74 on the same shaft 76 that drives wheel 78 as seen in FIG. 5 and arrange things so that when the wheel 78 reaches the end of its travel into the cone 80, the plate 74 contacts the outside edge of the cone 80. The two now revolve as a unit.

The outside edge of cone 80 can have a fiat ridge 82 to increase the contact area of the clutch action between the clutch plate 74 and the cone 80.

Figure 7:
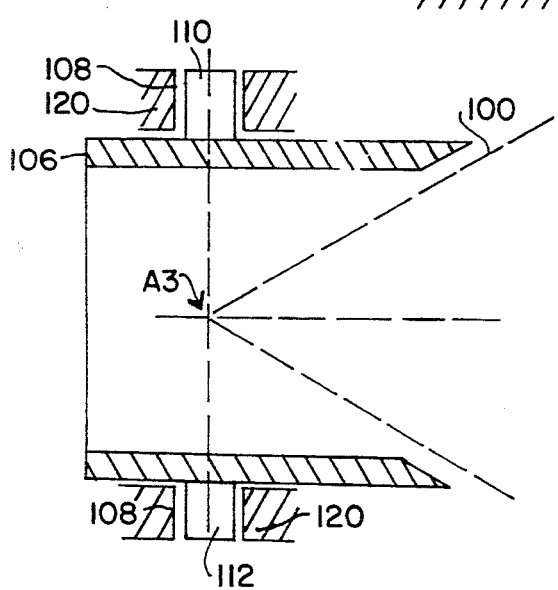
FIG. 7 shows a partial section taken at 90° to FIG. 6.

In FIG. 6, I show one of many possible mechanical schemes of carrying out my invention. The cone 100 is formed of suitable material such as steel. It terminates at its small end in an integrally formed cylindrical section 102. This section 102 mounted in two or more ball beatings 104. The outside of the beatings 104 are fixed in a member 106 that is pivoted in bearings 108 in the fixed frame of the machine 120 (see FIG. 7). Two pivots 110 and 112 have their center lines pass through the apex of the cone 100 located at point A3. This arrangement is best seen in FIG. 7 which is taken at 90 degrees to FIG. 6. Located concentrically with apex A3 is a universal joint 114 having one element of the joint fixed to the cylindrical section 102. The other end of the joint 104 ends in a shaft 116 that rotates with the rotation of the cone 100. This shaft 116 enables rotational energy to be fed into or out of the cone 100. The universal joint 114 can be of the constant velocity type, or of the single or double Hooke's type. The universal joint 114 at this point A3 enables the cone 100 to be tilted without affecting the rotation of the shaft 116.

The body 106 holding the bearings 104 is pivoted as described earlier and permits the cone 100 to contact the wheel 122 as indicated by the dotted lines of FIG. 4. A spring 118 can be placed between the body 106 and the frame 120 of the machine to urge the cone 100 so as to press its inner surface 124 against the wheel 122. A better arrangement is to make this pressing force a function of the load on the transmission. The idea of using the force between the two elements of a variable speed transmission to be changed depending on the torque transmitted is very old in the art. I would chose to do it electronically by sensing the torque on the shaft 116 by a torque measuring device and using an amplifier actuating an electro-magnetic solenoid or a torque motor 126 so that the tilting force on the cone 100 is made as high as necessary to provide the torque required by the load.

This torque motor 126 can also be made to release the transmission to prevent an excessive overload or for any other reason.

The positioning of the wheel 122 can be accomplished in a great many ways. It is particularly easy as compared to the mechanisms of the three patents previously analyzed in that the wheel 122 moves in a straight line and stays parallel to itself at all times. The rotating shaft can be mounted on an arm 133 that can be moved left or right (as seen in FIG. 6) by gear 130 driving the rack 132.

Figure 12:
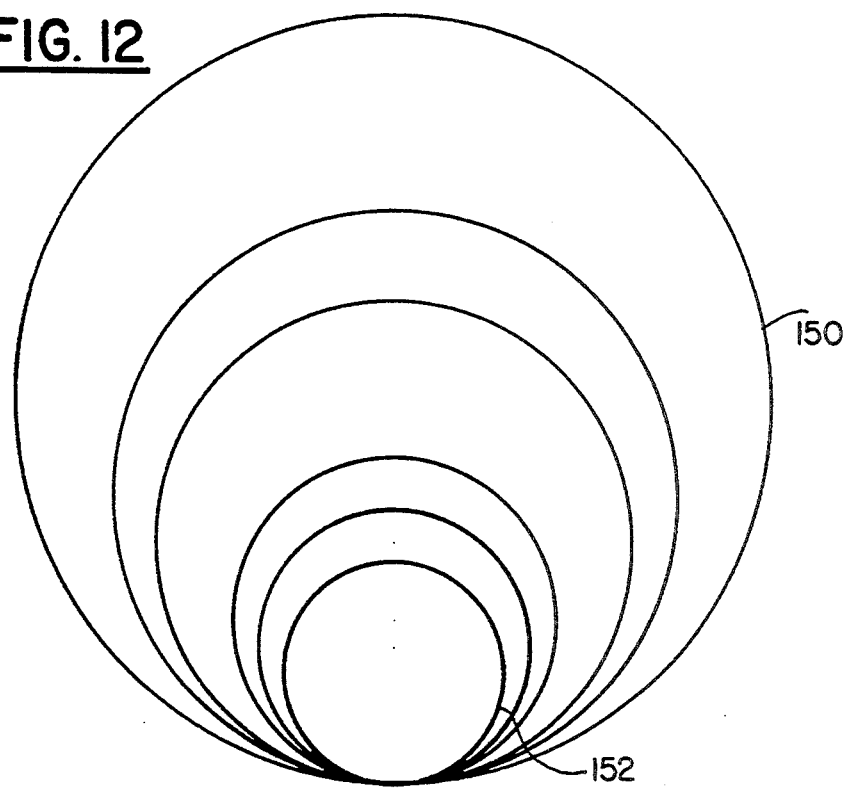
FIG. 12 shows the relative rolling circular elements of a wheel inside of a cone.

When analyzing the area of contact between the cone 150 (FIG. 12) and wheel 152 of my invention it should be noted that because the wheel is inside the cone, the length of contact is longer than it would be if I used an outside cone. Also as the wheel 152 moves closer and closer to the apex of the cone 150, the contact area increased till it completely surrounds the wheel, as explained before. This increase in contact area can be visualized by looking at FIG. 12.

So far I have shown the wheels that fit the cones as having a barrel shaped surface so that one element of this surface can become an element of a proper cone to roll on the main cone. If several specific speed ratios are to be used instead of a continually variable speed ratio, the surface of the wheel can be modified to have several actual and correct conical areas so that larger areas of contact can be achieved with completely correct rolling.

Figure 8:
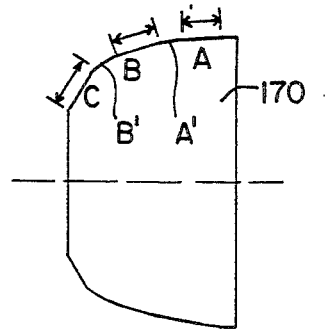
FIG. 8 shows the possible special shape of the wheel of my invention.

Consider, for example, FIG. 8. Here the wheel drawing is exaggerated to show detail. This wheel 170 has three conical areas, A, B, and C. The shape of the wheel 170 between these areas A, B, and C is rounded at A' and B' so that there is smooth transition between the true conical areas A, B, and C. The wheel 170 is shown as it would be in three selected positions of wheel 72 in FIG. 4. This would require accurate positioning of the wheel at the three desired locations. This presents no problem today for our sophisticated machine controls. The gear 130 of FIG. 6 can be driven by a stepping motor and a suitable electronic memory, or mechanical detents on member 133 can be used to fix the wheel 122 locations.

Such a pre-set system would act like a gear shifting mechanism except that it would be far simpler and the passage from one speed to the next above or below it would be continuous and smooth. The advantage of such pre-determined partial conical surfaces on the wheel 170 may be useful in the driving wheel of an automobile transmission. The time spent by the device on the curved portions A' and B' of the wheel 170 could be greatly reduced and the time spent on the true rolling conical surfaces A, B, and C greatly extended. This would result in increased efficiencies and longer life.

Many variable speed friction devices used today use a lubricating fluid that prevents the friction elements from touching each other but that transmits an appreciable amount of torque between the elements. The fluids seem to harden when squeezed between hard surfaces. To lubricate my device I can provide a spray jet 172 located at the open end of the cone 100 (FIG. 6) and supply the lubricant by a conventional fluid pump and reservoir. The entire mechanism of my device would then be enclosed and the fluid returned as is customary in lubricating our car engines.

Figure 9:
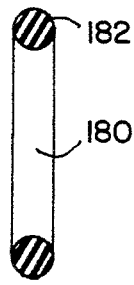
FIG. 9 shows a possible rubber tread wheel usable in my invention.

There is no doubt that for heavy duty service, metal to metal and well lubricated friction surfaces are preferable. But for light duty devices such as for variable speed occasional controls, or for instrument or laboratory work, the friction surfaces of the wheel can be made of rubber-like material and no lubrication would be required. The wheels can be shaped barrel-like as those in my drawings or be simple wheel 180 with a "rubber" tire 182 as shown in FIG. 9. Simple "O" rings can be used. Such driving or driven wheels would be low in cost and the tire can be easily replaced when worn.

Because the output shaft 116 of the universal joint 114 at the apex of the cone 100 of my device in FIG. 6 is in line with the axis of the wheel 122, it is easy to arrange two (or more) of my transmissions in one line. This could mean that each of the two mechanisms can have a low speed ratio, like 2½ to 1, with the overall ratio then being 6 to 1.

The advantage of a low ratio friction transmission is that the inner wheel 122 can be made much larger relative to the cone 100 diameter. The areas of contact would then be much larger, and the final position that results in a clutch action much more favorable.

Figures 10, 11:
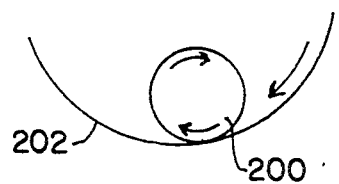
FIG. 10 shows the relative directions of rotation when a wheel is located inside a cone.
FIG. 11 shows the relative directions of rotation when a wheel is located outside of the cone.

While in all the drawings of my invention described so far I show that the rotation is in one direction if the rotary direction of one element is fixed, I can reverse the relative direction if I change the mechanism as shown in FIGS. 10 and 11.

Here I show the wheel 200 as contacting the outside surface of the cone 202. For comparison please note the FIG. 10. If, for example, the wheel 200 is rotated clockwise, the cone 202 will also rotate clockwise. However, if the two elements 200 and 202 are rearranged to contact as seen in FIG. 11, clockwise rotation of the wheel 200 will be accompanied by counter-clockwise rotation of the cone 202.

The arrangement of FIG. 11 does reduce the contact area between the two rolling members, but this may be acceptable, particularly in high ratio speed transmitting.

Figure 13:
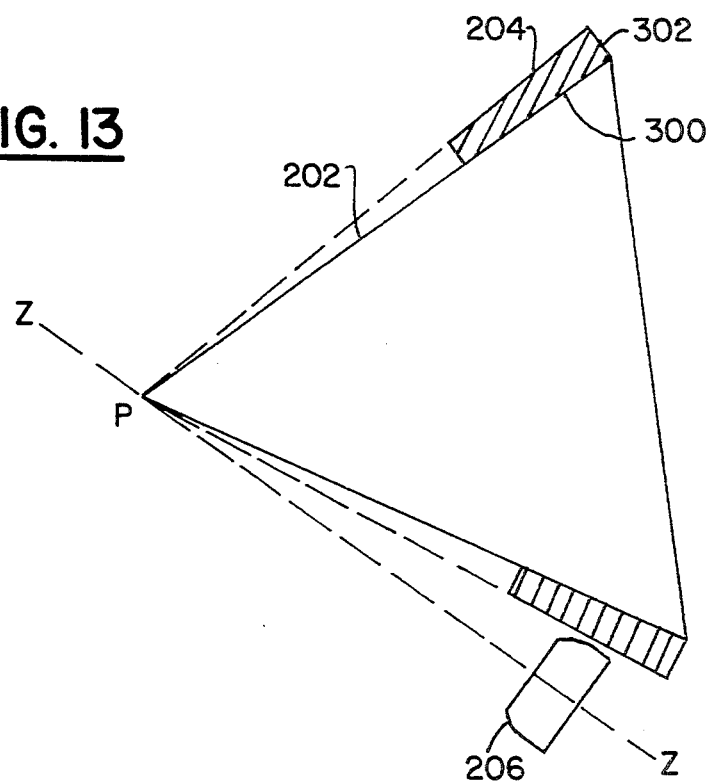
FIG. 13 shows how the inside and outside surfaces of a practical cone can have conical surfaces with a single common apex.

It may be noted that when wheel 200 in FIG. 11 rolls on the outside of cone 202 its rolling may not be quite as correct because if the cone 202 is thick with a wall of uniform thickness, the outside surface has a different apex. This can be easily corrected if the outside surface is machined to have its apex identical with that of the inner surface as shown in FIG. 13. Here the inner surface 300 of cone 202 has an apex at point P. The outside surface 204 can be formed to have the its apex also at P.

This means that a wheel 206 with a rotating axis Z—Z passing through point P will roll correctly with the outside surface 204 of cone 302. This construction is possible if the cone surface 204 does not extend all the way down to point P. As stated before, the reverse direction indicted in FIG. 11 may not require more than a partial cone surface 204.

In the accompanying claims I shall use the word "cone" as I have defined it earlier. That is, it can be male or female or fiat. HI use the word "wheel" to define any generally cylinderical member that may be a simple wheel with a rounded edge or one carrying a tire, or a cylinderical member generally barrel shaped so that when it contacts a surface of a cone its axis can be tilted relative to the cone surface.

I claim:

1. A continuously variable speed transmission comprising a straight line cone rotatable about a first axis and a wheel rotatable about a second axis, said wheel contacting the surface of the cone so that mutual rotation of the said cone and said wheel can transmit rotation from one to the other, means to move said wheel along said second axis so that the said wheel contacts the said cone at different points along a line that generates the said cone, said second axis always passing through a fixed point on said first axis, said point being the apex of the said cone, means to change the angle between he two axes without changing the location of the said fixed point, means to provide a force applied to said cone so that it is in constant frictional contact with said wheel as said wheel is moved along said line of the cone, and separate means to support said cone and said wheel for rotation about their respective axes, said separate means supporting the said cone are so mounted that they can tilt the axis of the cone about a line passing through the said apex.

2. The invention as defined in claim 1 and supporting means for the said wheel that transmit rotary motion to and from the said wheel on its said axis, said axis at all times passing through said apex of the said cone.

3. The invention of claim 1 and means to change the relative position of the said cone and said wheel so that the directions of relative rotation of the said cone and said wheel can be reversed.

4. The invention of claim 1 and means to change the relative position of said cone and said wheel so that the speed of relative rotation of the said cone and said wheel can be changed without changing the location of the said fixed point, said fixed pint being the apex of the said cone, and moving means comprising the said means to move said wheel to a position where the rotational speed of the said cone is equal to the rotational speed of the said wheel and clutch means separate from said wheel also operated by the said moving means to couple the said clutch means to said cone.

5. A continuously variable speed transmission comprising a straight line cone rotatable about a first axis and a wheel rotatable about a second axis, said wheel contacting the surface of the cone so that mutual rotation of the said cone and said wheel can transmit rotation from one to the other, means to move said wheel along said second axis so that the said wheel contacts the said cone at different points along a line that generates the said cone, said second axis always passing through a fixed point on said first axis, said point being the apex of the said cone, means to change the angle between the two axes without changing the location of the said fixed point, means to provide a force applied to said cone so that it is in constant frictional contact with said wheel as said wheel is moved along said line of the cone, and separate means to support said cone and said wheel for rotation about their respective axes, and flexible rotary joint means located at or near the apex of the said cone so that rotation of the said cone can be transmitted through this flexible joint to an external element independently of the angle between the said two axes.

6. A continuously variable speed transmission comprising a straight line cone rotatable about a first axis and a wheel rotatable about a second axis, said wheel contacting the surface of the cone so that mutual rotation of the said cone and said wheel can transmit rotation from one to the other, means to move said wheel along said second axis so that the said wheel contacts the said cone at different points along a line that generates the said cone, said second axis always passing through a fixed point on said first axis, said point being the apex of the said cone, means to change the angle between the two axes without changing the location of the said fixed point, means to provide it force applied to said cone so that it is in constant frictional contact with said wheel as said wheel is moved along said line of the cone, and separate means to support said cone and said wheel for rotation about their respective axes, said wheel is provided with a plurality of conical surfaces, each revolving about the said single axis, said conical surfaces being elements of different concentric cones and means to locate said wheel at different pre-selected locations contacting said cone so that the said conical elements exhibit pure rolling where they contact the cone, and means to locate the said wheel at said different pre-selected locations so that pure rolling action can be obtained, and smooth rotary shapes on said wheel between said conical sections so that transfers of contacts between the various conical sections can be smoothly achieved without rotary shocks to the said cone.

* * * * *